United States Patent [19]

Schlick

[11] 4,212,425
[45] * Jul. 15, 1980

[54] ELECTRICALLY HEATED WINDSHIELD WASHER SPRAY NOZZLE ASSEMBLY

[75] Inventor: Horst Schlick, Schwalbach, Fed. Rep. of Germany

[73] Assignee: Vdo Adolf Schindling AG., Schwalbach, Fed. Rep. of Germany

[*] Notice: The portion of the term of this patent subsequent to May 9, 1995, has been disclaimed.

[21] Appl. No.: 881,635

[22] Filed: Feb. 27, 1978

Related U.S. Application Data

[63] Continuation of Ser. No. 595,326, Nov. 6, 1975, Pat. No. 4,068,269.

[51] Int. Cl.² .......................... B60S 1/52; H05B 1/00; B67D 5/62; B05B 1/24
[52] U.S. Cl. .............................. 239/133; 15/250.05; 137/341; 219/203; 219/301; 219/505; 222/146 HE; 239/284 R
[58] Field of Search ............... 219/301, 504, 505, 535, 219/214, 202, 203, 338; 15/250.01–250.05, 250; 239/13, 128, 130–135, 284 R, 284 A; 137/341; 165/41; 98/2.1; 222/146 R, 146 HE, 146 HA; 138/33

[56] References Cited

U.S. PATENT DOCUMENTS

| | | | |
|---|---|---|---|
| 2,390,475 | 12/1945 | Thomas | 219/535 |
| 2,593,459 | 4/1952 | Johnson | 219/535 X |
| 2,861,163 | 11/1958 | Asakawa | 219/504 X |
| 3,008,649 | 11/1961 | Bock et al. | 239/284 |
| 3,144,174 | 8/1964 | Abplanalp | 239/135 X |
| 3,199,787 | 8/1965 | Oishei et al. | 239/284 |
| 3,243,753 | 3/1966 | Kohler | 219/505 X |
| 3,338,476 | 8/1967 | Marcoux | 219/505 X |
| 3,579,662 | 5/1971 | Lowry et al. | 219/301 UX |
| 3,662,149 | 5/1972 | Lipinski | 219/505 X |
| 4,088,269 | 5/1978 | Schlick | 219/301 X |

FOREIGN PATENT DOCUMENTS

| | | | |
|---|---|---|---|
| 1505356 | 9/1969 | Fed. Rep. of Germany | 239/284 |
| 2221522 | 11/1973 | Fed. Rep. of Germany | 239/284 |
| 2245910 | 4/1974 | Fed. Rep. of Germany | 239/284 |
| 960974 | 6/1964 | United Kingdom | 15/250.01 |

OTHER PUBLICATIONS

"A New System for Freeze–Protection of Safety Showers and Eyewashes," Bedard, 11th Biennial IEEE Conference on Electrical Process Heating in Industry, Apr. 1973, Cleveland, Ohio, pp. 93–95.

Primary Examiner—A. Bartis
Attorney, Agent, or Firm—Otto John Munz

[57] ABSTRACT

An electrically heated spray nozzle assembly adapted to be mounted upon an automotive vehicle in a position to direct a fluid spray upon the windshield thereof includes a hollow angled pipe having a fluid inlet at one end and a spray nozzle at its other end. The pipe is enclosed in a housing made of heat-insulating thermoplastic material and a pill-shaped PTC heating element is mounted in a downwardly open chamber in the housing below the nozzle. The element is in contiguous heat exchange relationship with the pipe and nozzle and the power supply connections thereto pass through a plastic closure element closing the downwardly open chamber. The housing is circumferentially grooved for releasable engagement with the rim of an opening in the vehicle body. The PTC element has its temperature-resistance curve rising sharply at or about 0° C. with its steepest portion below 50° C.

2 Claims, 2 Drawing Figures

ELECTRICALLY HEATED WINDSHIELD WASHER SPRAY NOZZLE ASSEMBLY

This is a continuation to copending patent application Ser. No.: 595,326, filed Nov. 6, 1975, now U.S. Pat. No.: 4,068,269 of May 9, 1978.

FIELD OF THE INVENTION

The invention relates to a spray nozzle for windshield washing devices of motor vehicles with an appurtenante electric heating device.

DESCRIPTION OF THE PRIOR ART

Spray nozzles already are known which provide on the pipe connection for the feed hose a filament winding connected directly or by way of a switch, to the power supply circuit of the motor vehicle. Such a filament winding prevents an ice formation in the nozzle orifice of the spray nozzle at temperatures near or below the freezing point, caused by cold-air flow during the travel, and the clogging of the nozzle. Such electrically heatable spray nozzles present considerable disadvantage in that they increase substantially the total load of the power supply voltage source which, due to a multiplicity of other simultaneously electrically operated devices frequently approaches the limiting load. For this reason such spray nozzles did not meet with success in practice.

In another known spray nozzle, bores are provided in the tip of the nozzle, through which the heated air flows from the space under the hood of the vehicles to the outside. This device does prevent ice formation in the orifice of the nozzle and avoids an additional load upon the power-supply voltage-source creates, however, the danger that, for instance when the exhaust manifold leaks, poisonous gases may escape from the space under the hood through the bores and subsequently enter the passenger compartment through the adjacent fresh-air ventilation inlets thereof. Therefore such spray nozzles have not succeeded either.

Spray nozzles also are known which provide as the heating device a resistance in the electric circuit of the motor vehicle, for instance a resistance located in the device that controls the light-generating dynamo. Such a heating device avoids an additional load of the power supply voltage source. It presents, however, the disadvantage that, especially in vehicles with a rear engine drive, long electric connection lines must be provided. This affects unfavorably the assembly cost of such a heating device. Furthermore, the substantial dimensions of the resistors usable for the heating device result in an undesirable enlargement of the structural volume of the spray nozzle.

SUMMARY OF THE INVENTION

The objects of the invention are to provide: a spray nozzle with a heating device whose structural volume is not at all, or only slightly, larger than that of a non-heated spray nozzle, which has the power voltage supply source loaded as little as possible and whose assembly can be carried out at the smallest possible expense in electric installation material and labor.

Another object of the invention is to provide in the heating device at least one PTC heating element.

DESCRIPTION OF THE PREFERRED EMBODIMENT

A cold conductor or PTC heating element has at low ambient temperatures an extremely low resistance which at rising ambient temperatures rapidly rises to very high values. When the cold conductor is fed a constant or nearly constant operating voltage, a large current flows therefor throughout it at low ambient temperatures, and a small current at high ambient temperatures. Consequently, the cold conductor produces at temperatures near or below the freezing point a high power loss by which in accordance with the invention the nozzle is heated and therefore kept free from ice. At higher temperatures, however, only a small power loss occurs in the PTC heating element, so that the load of the power supply circuit remains limited to a minimum. Due to the small external dimensions of the PTC heating element, the structural volume of the spray nozzle thus heated is only slightly larger than that of a non-heated spray nozzle, and considerably smaller than that of the known heatable spray nozzles. Since the connection of the PTC heating element to the power supply circuit can be carried out at any point, the expense in electric installation and material are kept within narrow limits.

Figure 1:
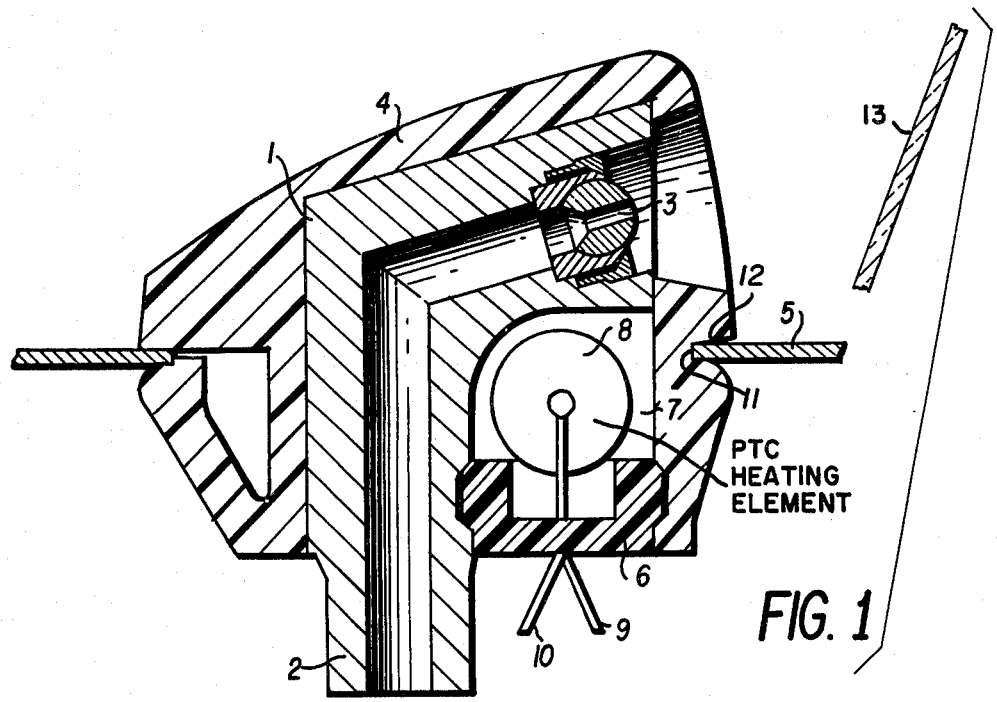
FIG. 1 of the drawings is a cross-sectional view partly diagrammatical of the device of the invention.
Figure 2:
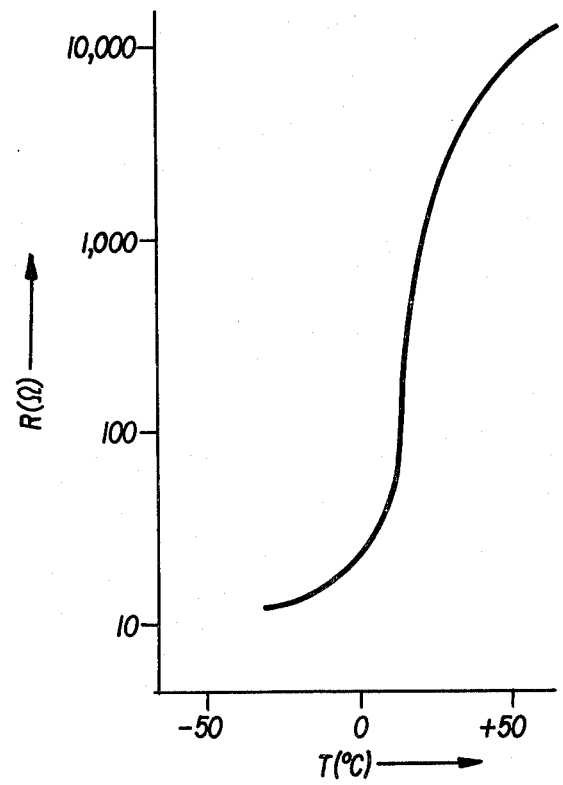
FIG. 2 represents a steep resistance-temperature characteristic curve.

In accordance with the invention a PTC heating element is provided whose bend in the resistance-temperature characteristic curve is positioned below the temperature freezing point. In such an instance the power supply circuit is loaded to a particularly slight degree at higher temperatures. For the same reason it is advisable to employ a PTC heating element with a steep resistance-temperature characteristic curve. FIG. 2 is a graph wherein ordinates and abscissas represent to scale, ohmic resistance of a suitable PTC heating element, and ambient temperature, respectively. From the curve it is noted that at about 0° C. the curve rises sharply to about 50° C. at which latter temperature its rate of increase decreases so that its steepest portion lies between about 0° and 50° Celsius.

A further decrease in the load of the power supply circuit by the heating device is accomplished by enveloping the spray nozzle and the PTC heating element with a heat-insulating plastic casing.

The spray nozzle, which is shown in longitudinal section, has a nozzle body 1, preferably of aluminum, which at one of its ends changes over into a connecting pipe 2, and to whose other end or terminal portion is fastened a nozzle 3. Body 1 thus forms an angled pipe. The nozzle body is mounted in a housing 4 of thermoplastic material, which serves as a heat-insulating casing and is provided with means for releasably fastening the housing in an opening 11 of hood 5 of the motor vehicle. For this purpose housing 4 is provided with an external circumferential groove 12 engaging the rim of opening 11 and by which the housing and parts carried thereby are supported and releasably retained within the opening. The parts are so disposed upon hood 5 that nozzle 3 may project a spray of fluid onto the windshield of the vehicle, a portion thereof being identified at 13. The nozzle body, which in the assembly of the spray nozzle is inserted in the housing 4, is fixed therein by means of a removable closure element 6. Within a space 7 which is formed by the nozzle body the housing 4 and the closure element 6, is mounted the pill-shaped PTC heating element 8 whose electric connections 9 and 10 pass through the plastic closure element 6 to the outside.

What is claimed is:

1. A apparatus for spraying such as the windshield of an automotive vehicle comprising:
    a hollow angled pipe of thermally conductive material, having a fluid inlet and a terminal portion;
    a spray nozzle assembly of thermally conductive material and mounted on said terminal portion;
    housing means of thermally insulating material enclosing said pipe and adapted for a detachable mounting upon the vehicle, adjacent the windshield thereof in a position such that fluid spray from said nozzle assembly is directed onto the exterior surface of the windshield; and forming a chamber with a downwardlyfacing opening beneath the nozzle assembly;
    a PTC heating element mounted in said chamber contiguous to and in heat exchange relation with said nozzle assembly and pipe;
    said PTC element having a pill-shaped structure, whose electric connections from a power supply pass through a plastic closure element to the outside;
    said closure element being removably fixed in said housing and closing said downwardly-facing opening,
    said housing being formed of heat-insulating thermoplastic material and being circumferentially grooved for releasable engagement with the rim of an opening in the body surface of the vehicle,
    said PTC heating element having a temperature resistance curve such that at low ambient temperatures a low resistance and at high ambient temperatures a high resistance occurs;
    the Curie point of said curve being at or just below the freezing point temperature of water and rising sharply at or about 0° C. with its steepest portion below about 50° C.

2. A windshield washing device as claimed in claim 1, said angled pipe comprising:
    a first vertical section and
    a second directed upwardly and rearwardly to said terminal portion.

* * * * *